United States Patent [19]
Moxon

[11] 3,956,829
[45] May 18, 1976

[54] WHEEL TRUING AID FOR BICYCLES

[76] Inventor: Arron L. Moxon, 524 E. E St., Burns, Oreg. 97720

[22] Filed: Oct. 21, 1974

[21] Appl. No.: 516,255

[52] U.S. Cl............................ 33/203.19; 33/203.20
[51] Int. Cl.²............................................ G01B 3/00
[58] Field of Search............ 33/203, 203.15, 203.16, 33/203.17, 203.18, 203.19, 203.20, 203.21

[56] References Cited
UNITED STATES PATENTS

| 1,073,042 | 9/1913 | Heller | 33/203.19 |
| 1,410,224 | 3/1922 | Schwartz | 33/203.19 |

FOREIGN PATENTS OR APPLICATIONS

| 605,953 | 11/1934 | Germany | 33/203.19 |
| 668,900 | 11/1938 | Germany | 33/203.19 |

Primary Examiner—Richard E. Aegerter
Assistant Examiner—Steven L. Stephan
Attorney, Agent, or Firm—James D. Givnan, Jr.

[57] ABSTRACT

An aid for use in checking bicycle wheels for true rotation including a base having clips thereon for clamped attachment to the bicycle fork or seat stay. A straightedge reference member is positionable alongside the wheel rim. A support member for said reference straightedge member is pivotally attached to said base to permit precise positioning of the reference member against the wheel rim. Certain components of the aid are flexible to yield upon wheel contact.

2 Claims, 3 Drawing Figures

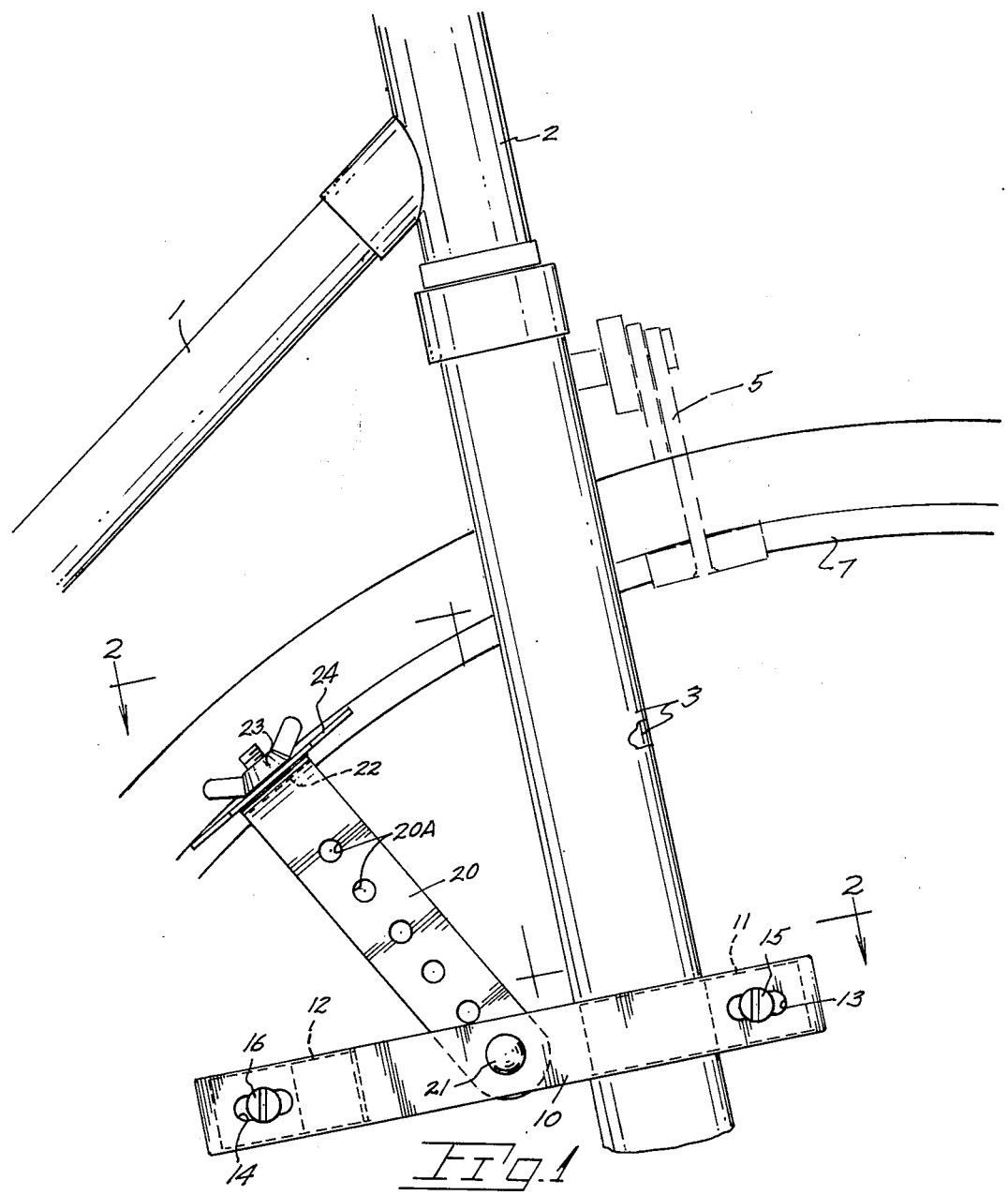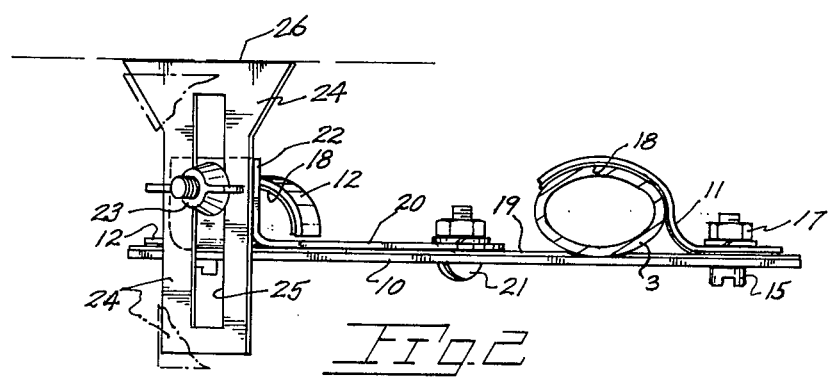

WHEEL TRUING AID FOR BICYCLES

BACKGROUND OF THE INVENTION

The present invention concerns a device for temporary attachment to a bicycle for the purpose of providing a reference edge past which a wheel is rotated for checking whether or not the wheel is in true as evidenced by an absence of lateral wheel displacement.

Important to the proper operation of a bicycle, and particularly multi-speed touring bicycles, is the degree of true for each wheel. Where bicycles are operated at low speeds an out of true condition is of little importance while at higher speeds such a condition will cause vibration of the bicycle and impair caliper brake operation. To remedy an out of true condition it is customary to adjust certain of the wheel spokes in a hit or miss fashion with repeated attempts usually being required to accomplish wheel truing. A problem exists in checking bicycle wheels with the person often relying simply on a visual indication of fluctuating wheel clearance between a frame or fork member. Existing truing devices I am aware of are not suitable for use on bicycles having caliper or rim contacting brakes. Additionally such devices are cumbersome, not lending themselves to convenient inclusion within the bicycle tool kit.

SUMMARY OF THE INVENTION

The present invention is embodied within a wheel truing aid having a straightedge temporarily positionable adjacent a wheel rim and suitably spaced from the bike frame or fork to clear bicycle brake assemblies.

The truing aid is adapted for temporary engagement with either the bicycle fork member or a seat stay member of the bicycle frame and pivotally mounts a positionable support member on which is carried an adjustable straightedge. The support member is radially disposed with respect to a wheel rim with a straightedge reference member in close proximity with the wheel being checked. Said reference member is of thin gauge construction which upon contact with the wheel rim emits a sound to provide both aural and visual indications of rim contact. A base member of the aid is provided at its ends with clips configured for either fork or seat stay clamped engagement. Further, the attachment member and clips are provided with resilient material to affect gripping contact with the bicycle to provide a rigid temporary connection.

Objects of the present invention include the provision of: a wheel truing aid particularly adapted for use with bicycles having rim contacting caliper brake assemblies; a truing aid having a straightedge of thin gauge metal providing both a visual and aural indication of rim proximity during wheel rotation; a truing aid having a straightedge to provide a yieldable reference mark during spoke adjustment; a truing aid having bicycle engaging members coated with a resilient material to facilitate firm gripping engagement with the bicycle; and a truing aid for attachment to a fork member or alternatively, a seat stay by means of clips mounted on opposite ends of a base member which are specifically configured for fork or stay engagement.

BRIEF DESCRIPTION OF THE DRAWING

In the accompanying drawing:

FIG. 1 is a fragmentary, side elevational view of a bicycle fork with the present truing aid attached thereto, FIG. 2 is a plan view taken along irregular line 2—2 of FIG. 1.

DETAILED DESCRIPTION OF THE PREFERRED EMBODIMENT

Figure 3:
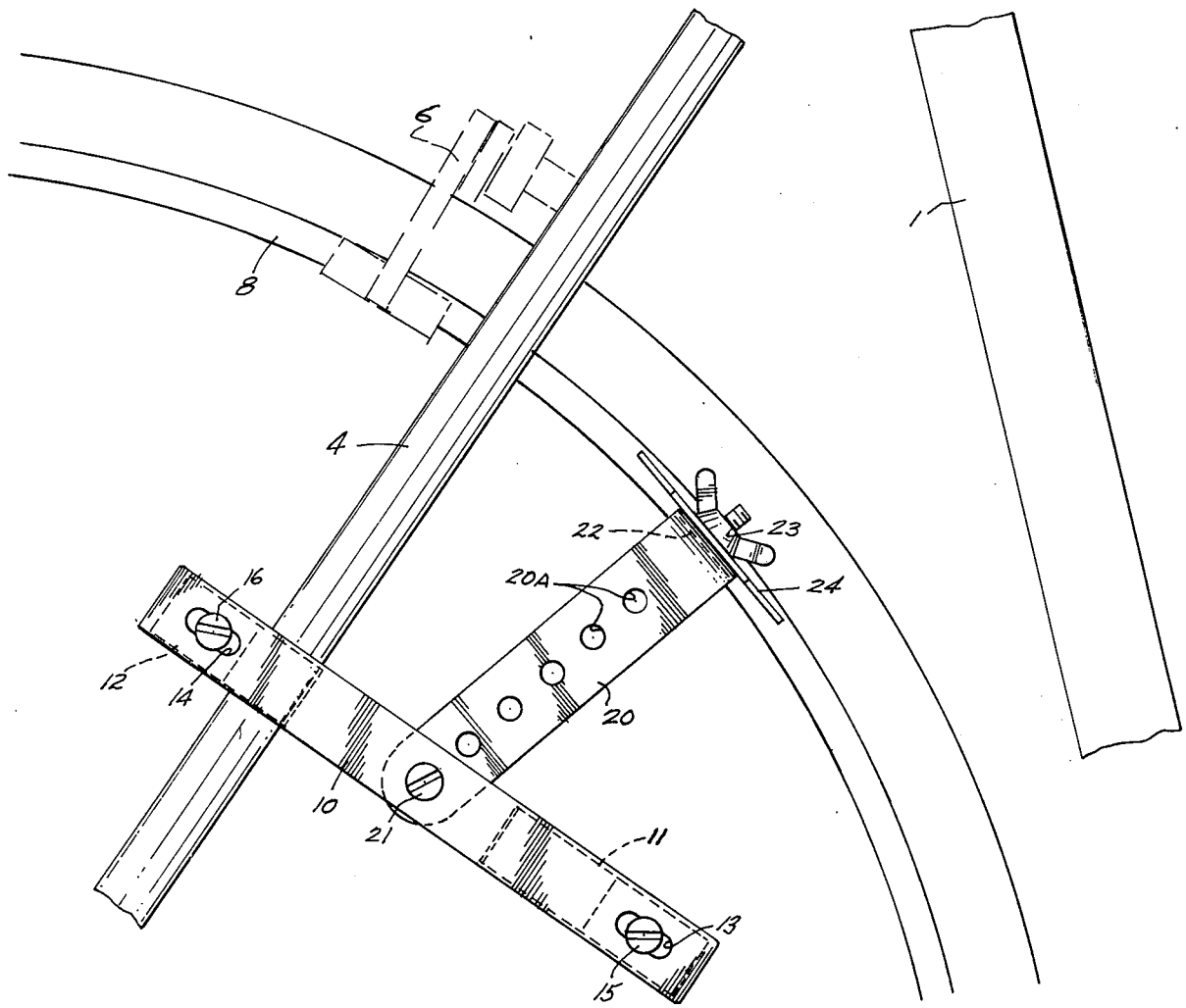
FIG. 3 is a view similar to FIG. 1 showing the truing aid attached to the seat stay of a bicycle frame.

With continuing reference to the accompanying drawing wherein applied reference numerals indicate parts similarly identified in the following specification, the reference numeral 1 indicates frame members of a bicycle having a steering collar 2 within which is journalled the steering post of a front fork 3. A seat stay is indicated at 4 (FIG. 3) with the foregoing structure intended as being typical of a conventional bicycle construction. A front caliper brake assembly is shown in broken lines at 5 while a similar rear wheel brake assembly is indicated at 6 in FIG. 3 acting on front and rear wheel rims 7 and 8 in the well known manner.

A base 10 of the present truing aid is of elongate configuration and mounts adjacent each of its ends clips 11 and 12 each of unlike curvature for engagement with different bicycle components. Each end of the base defines oblong slots 13 and 14 for the reception of fastener elements 15 and 16 which extend through apertures in the clips for engagement with respective nut elements as at 17. Clip 11, as viewed in FIG. 2, is concave on its inner side for engagement with the elliptical bicycle fork 3 while clip 12 is of more circular configuration for positive engagement with the cylindrical seat stay 4. Each of said clips as well as the opposing surface of base 10 is coated with a resilient material 18 and 19 which contributes towards secure engagement of the aid with the bicycle components while avoiding marring of the bicycle finish. The base as well as said clips are desirably formed from a lightweight aluminum alloy.

An angular support member at 20 is pivotally mounted by means of a fastener assembly 21 to base 10 intermediate its ends to permit said member to be inclined outwardly (away from the fork or seat stay) into a radial disposition with a bicycle wheel rim. Fastener assembly 21 along with the resilient coating 18 provides suitable friction to assure support member 20 remaining in place against accidental movement. Apertures at 20A permit selective engagement of fastener assembly 21 to best suit the truing task at hand. Support member 20 terminates upwardly in a right angular extension 22 which serves to mount a wing nut and screw assembly 23 passing through the extension and through a straightedge member 24. Member 24 defines a slot 25 permitting adjustment of member 24 toward and away from the wheel rim surface. A straightedge at 26 is preferably at least a couple of inches in length for positioning into substantial abutment with the wheel rim surface. Said member is of metal of lightweight gauge producing an intermittent sound upon contact with a moving wheel rim to provide an aural signal of an out of true condition. As member 24 is of a softer metal than the wheel rim, marring of the latter is avoided.

In a wheel truing operation the base 10 is temporarily mounted on the bicycle fork 3 or seat stay 4 with subsequent positioning of support member 20 into radial relationship with the wheel rim. Accordingly, straightedge member 24 is disposed so as to position its straightedge 26 flush against rim 7 or 8 to constitute a reference edge for evaluation of lateral displacement of the rim as occurs in an out of true wheel. Displacement of an out of true rim toward member 24 results in a scraping sound with the support member being of a flexible nature to momentarily yield.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A wheel truing aid for temporary attachment to a bicycle to provide a reference against which wheel trueness may be evaluated, said aid comprising in combination, a base, clips of different configurations mounted adjacent opposite ends of the base facilitating attachment of the base alternatively to a bicycle fork or a seat stay of the bicycle frame, a support member of a flexible nature having a right angular extension formed at one of its ends, means pivotally attaching the opposite end of the support member to said base intermediate the base ends to permit positioning of the support member into radial relationship with the wheel axis, and a straightedge reference member also of a flexible nature adjustably mounted on said right angular extension of said support member for positioning toward or away from a wheel rim and terminating outwardly in a straightedge for initial positioning adjacent the wheel rim whereby upon wheel rotation any out of true condition of the wheel may be evaluated, the flexible nature of said support member constituting a yieldable support for said reference member whereby said member may be displaced during a wheel truing operation.

2. The wheel truing member as claimed in claim 1 wherein said support member is apertured at spaced apart points for purposes of adjustably mounting same on said base to facilitate straightedge reference member contact with the wheel rim.

* * * * *